CRYOELECTRIC MEMORIES

Filed April 3, 1964 6 Sheets-Sheet 1

INVENTORS
JAMES C. MILLER &
CHARLES M. WINE
BY Samuel Cohen
Attorney

INVENTORS
JAMES C. MILLER &
BY CHARLES M. WINE
Samuel Cohen
Attorney

INVENTORS
JAMES C. MILLER &
BY CHARLES M. WINE
Samuel Cohen
Attorney

CRYOELECTRIC MEMORIES

Filed April 3, 1964 6 Sheets-Sheet 4

INVENTORS
JAMES C. MILLER &
CHARLES M. WINE
BY
Samuel Cohen
Attorney

CRYOELECTRIC MEMORIES

Filed April 3, 1964 6 Sheets-Sheet 5

INVENTORS
JAMES C. MILLER &
CHARLES M. WINE
BY
Samuel Cohen
Attorney

Jan. 31, 1967 J. C. MILLER ETAL 3,302,188

CRYOELECTRIC MEMORIES

Filed April 3, 1964 6 Sheets-Sheet 6

INVENTORS
JAMES C. MILLER &
CHARLES M. WINE
BY Samuel Cohen
Attorney

United States Patent Office 3,302,188

Patented Jan. 31, 1967

3,302,188
CRYOELECTRIC MEMORIES

James C. Miller, Pennington, and Charles M. Wine, Princeton, N.J., assignors to Radio Corporation of America, a corporation of Delaware Filed Apr. 3, 1964, Ser. No. 357,132
6 Claims. (Cl. 340—173.1)

This invention relates to improvements in cryoelectric memories.

A continuous sheet cryoelectric memory, described in Burns et al., "A Large Capacity Cryoelectric Memory With Cavity Sensing," Fall Joint Computer Conference Proceedings, November 1963, includes a thin-film memory plane, $x$ and $y$ drive leads which are insulated from one another and from the memory plane located over one surface of the memory plane, and output means including a continuous sheet "sense plane" located on the other side of the memory plane. A drive current is applied to a selected $x$ drive lead and a selected $y$ drive lead to write information into a particular location in the memory plane. This information is stored as trapped flux beneath the cross-over point of the selected leads. The polarity of the stored trapped flux, that is, the direction of circulation of the persistent currents which are associated with the trapped flux, indicates the value of the bit stored (1 or 0).

Information is read out of the memory plane by applying interrogate or read current pulses to a selected $x$ and a selected $y$ drive lead. At the cross-over point of the selected leads, the magnetic field due to the read current pulses is of sufficient magnitude to penetrate through the memory plane and reverse the trapped flux when the bit stored is of one value (corresponding to trapped flux of one sense), but not when it is of the other value (when the trapped flux is of opposite sense). When the trapped flux reverses, an output "sense" signal is produced at the output terminals of the sense plane.

An object of the present invention is to provide a cryoelectric memory which is simpler in structure than the one discussed above.

Another object of the invention is to provide an improved sensing arrangement for a cryoelectric memory.

Another object of the invention is to provide a cryoelectric memory having relatively uniform signal response at different locations in the memory.

It has been discovered, in the memory of the invention, that a sense voltage develops across the same drive leads as carry the read currents, when the read currents cause a memory location to be driven normal. This makes it possible to eliminate the sense plane entirely and to obtain the read-out signals from the drive leads instead. It is believed that when read currents cause a memory location to be driven normal, the inductance of the leads carrying the current substantially increases (that is, the inductance of the portion, over the memory location, of the leads increases) because of the removal of the shielding effect on these leads of this location. This change in inductance, $dL/dt$, is believed to cause a voltage $$i\frac{dL}{dt}$$

where $i$ is the read current.

The invention is discussed in greater detail below and is described in the following drawings, of which:

FIGURE 1 is a schematic showing of one memory location in a cryoelectric memory;

FIGURES 2*a* and 2*b* are sections taken along line 2—2 of FIGURE 1 which show what occurs during the read interval under different conditions;

FIGURES 3*a* and 3*b* are plan and cross-sectional views, respectively, of a memory according to the invention, only one storage location being shown;

Figure 9A:
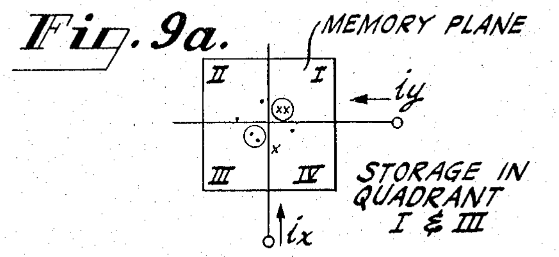
Figure 9B:
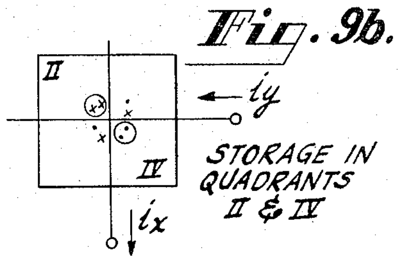
Figure 10:
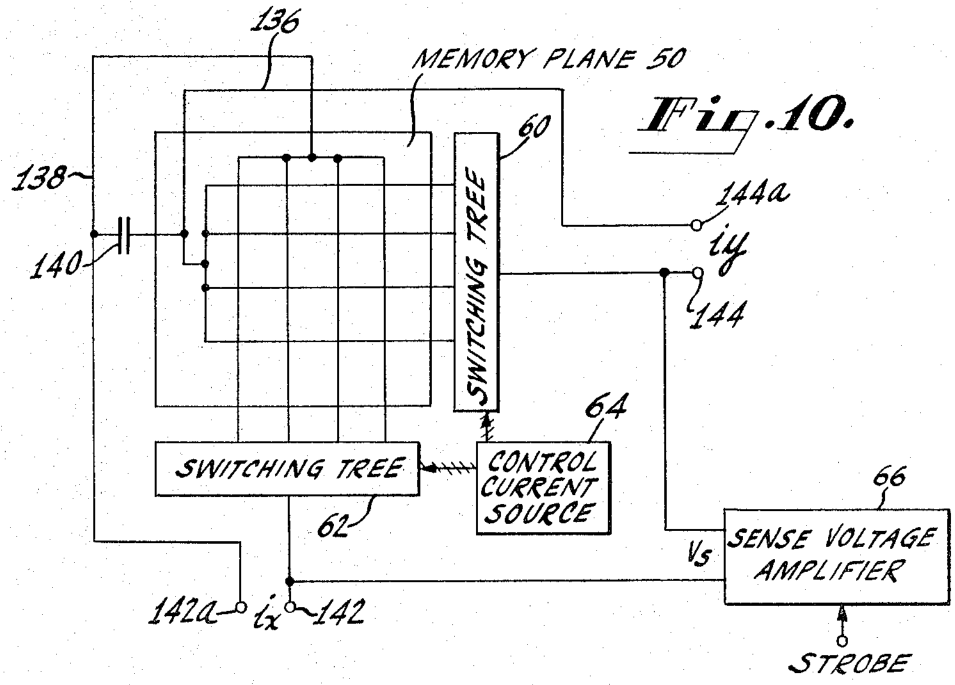
Figure 11:
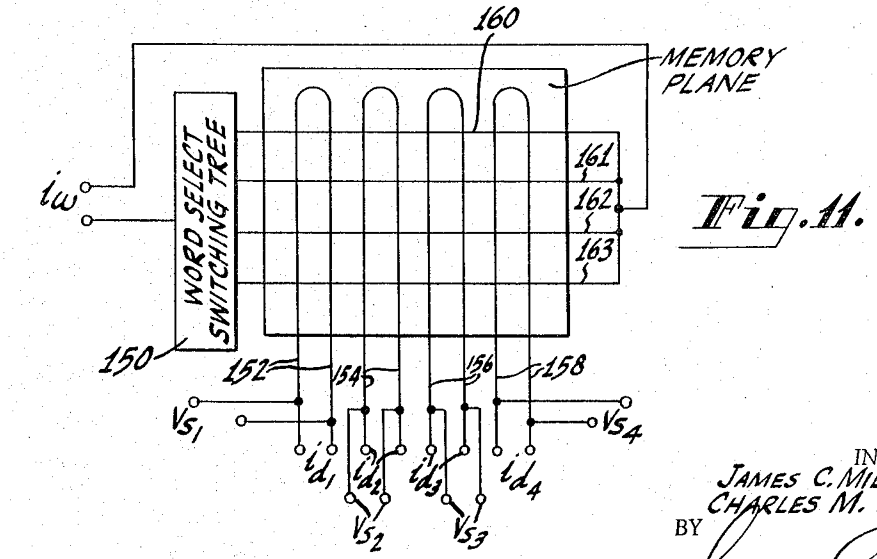
Figure 12:
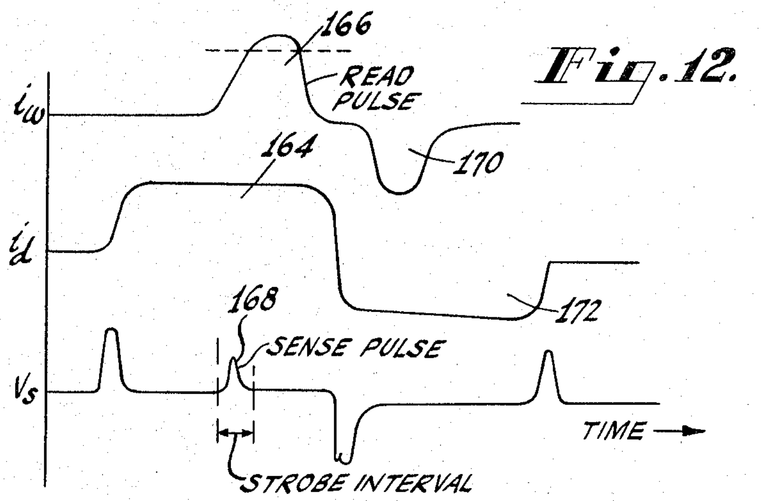

FIGURES 9*a* and 9*b* are sketches to explain how two bits may be stored at a given storage location;

FIGURE 10 is a schematic drawing of another cryoelectric memory according to the invention;

FIGURE 11 is a drawing of still another cryoelectric memory according to the invention, this one word-organized;

FIGURE 12 is a drawing of waveforms for the memory of FIGURE 11; and

Figure 13:
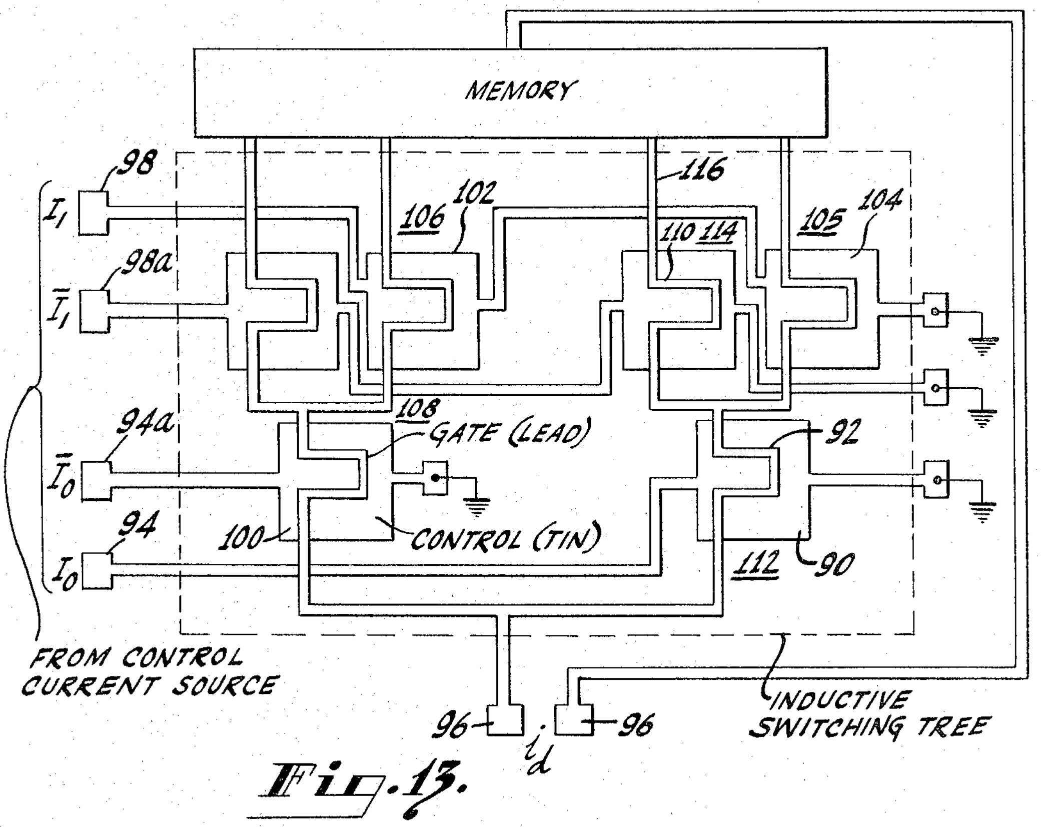

FIGURE 13 is a schematic showing of an inductive switching selection tree which is useful in the memory circuits above.

In the discussion which follows, the circuits discussed are assumed to be in a low temperature environment, such as a few degrees Kelvin, at which superconductivity is possible.

In the various figures which illustrate the invention, the superconductors, such as the memory plane, ground plane, drive lines, and so on, are preferably in the form of thin films which are vacuum deposited. These films are spaced from one another by insulation, such as a thin-film silicon monoxide layer. For the sake of drawing simplicity, in some cases the thin-film conductors are shown as single lines and, in all cases the thin-film insulator is not shown. In the cross-sectional views, rather than showing insulation, the conductors are shown spaced from one another, silicon monoxide being implied.

Figure 1:
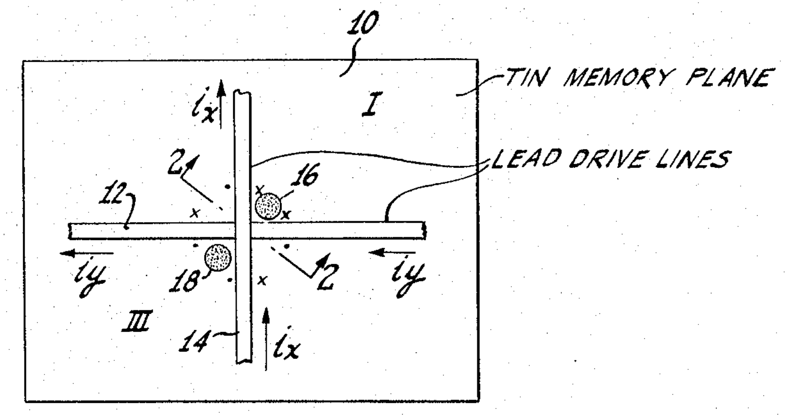

One storage location in a superconductive memory is shown in FIGURE 1. The memory includes a tin memory plane 10, a lead $y$ drive lead 12, and a lead $x$ drive lead 14. Information may be written into the memory by applying a $y$ drive current $i_y$ coincidentally with an $x$ drive current $i_x$. If the write currents are applied in the direction shown in FIGURE 1, the magnetic fields due to these currents add in quadrants I and III, as indicated by the crosses and dots. Accordingly, areas such as indicated schematically by the cross-hatching 16 and 18 are driven normal. Thereafter, when the drive currents are removed, flux which has penetrated through the memory plane is trapped. This trapped flux and the persistent current associated therewith represent a stored bit. The information stored in the memory may be read out by reversing the direction of the $x$ and $y$ currents.

Figure 2A:
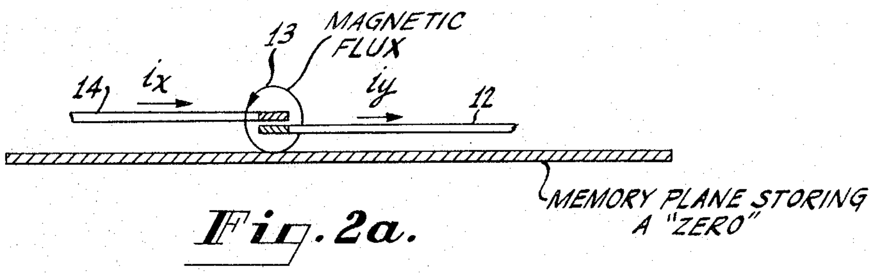
Figure 2B:
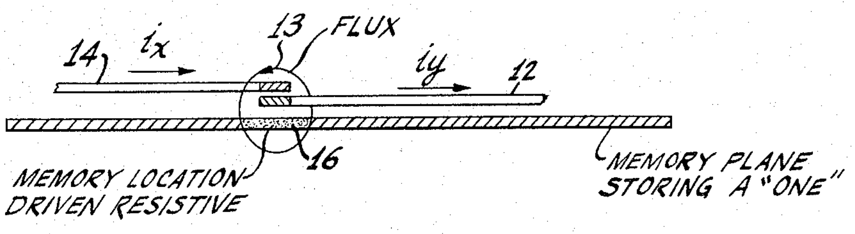

The read-out of the memory location of FIGURE 1 is illustrated in the cross-sectional views of FIGURES 2*a* and 2*b*. Note that the direction of the $x$ and $y$ currents is reversed. If it is assumed that the memory plane is storing a "0," then the magnetic fields due to the drive currents, as illustrated in FIGURE 2*a*, are opposed by the flux 13 trapped in the memory. Therefore this resulting magnetic field does not penetrate through the memory plane.

FIGURE 2*b* assumes that the memory is storing a "1." A "1" is the information written into the memory in FIGURE 1. In this case, the magnetic fields due to the currents $i_x$ and $i_y$ add to the flux trapped 13 in the memory plane and the resulting magnetic field is of sufficient magnitude to drive the area of the memory plane beneath the cross-over of the $x$ and $y$ lines normal, as indicated at 16.

In the present memory, a sense plane is not employed. Instead, use is made of the discovery that when a memory location, such as 16, 18 in FIGURE 1, is driven normal, voltages develop across the corresponding drive leads. These voltages are believed to be due to a sudden increase in inductance $dL/dt$ of the drive leads, and are believed to equal $$i\frac{dL}{dt}$$

where $i$ is the drive current. The change in inductance, in turn, is believed to be due to the removal of the shielding effect of the memory plane at the portion thereof driven to the normal state. However, whether or not this theory is correct, the circuits of the invention have been found to produce relatively large amplitude sense signals, as discussed in detail below.

Figure 3A:
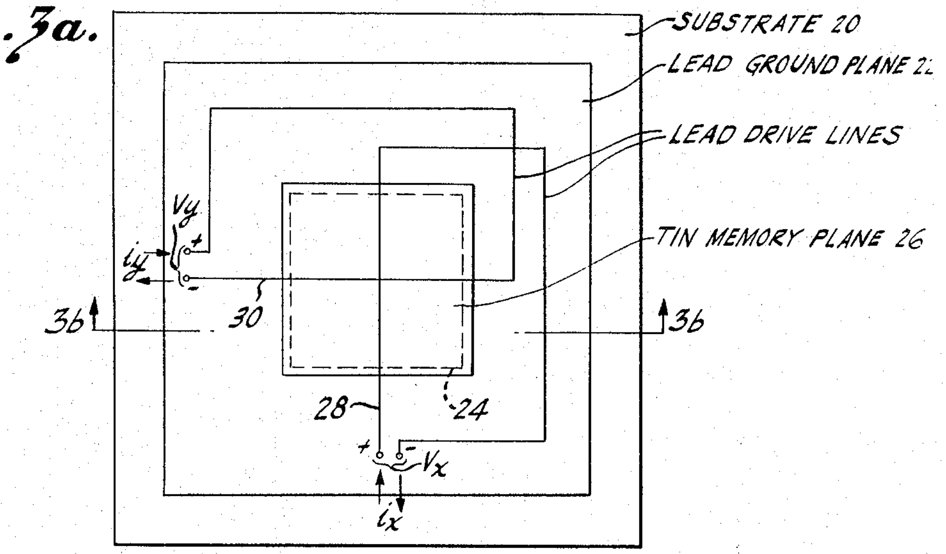
Figure 3B:
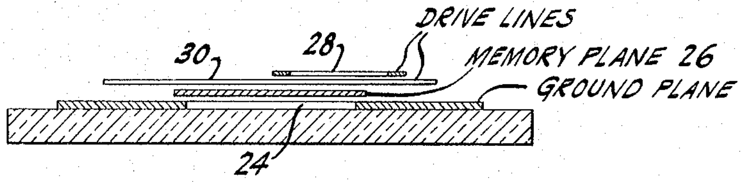

A more detailed showing of a memory having a single storage location appears in FIGURES 3$a$ and 3$b$. This memory includes a substrate 20 which may be formed of glass or the like and a lead ground plane 22 deposited on the substrate. The ground plane is formed with a central opening, as indicated by the dashed lines 24, and is also shown at 24 in FIGURE 3$b$. Silicon monoxide insulation (not shown) is deposited over the ground plane and the tin memory plane 26 is laid down on the insulation. The $x$ and $y$ drive lines 28 and 30 are insulated from one another and from the memory plane, and cross over at the memory plane. The drive lines are preferably formed of a superconductor material, such as lead.

Figure 4:
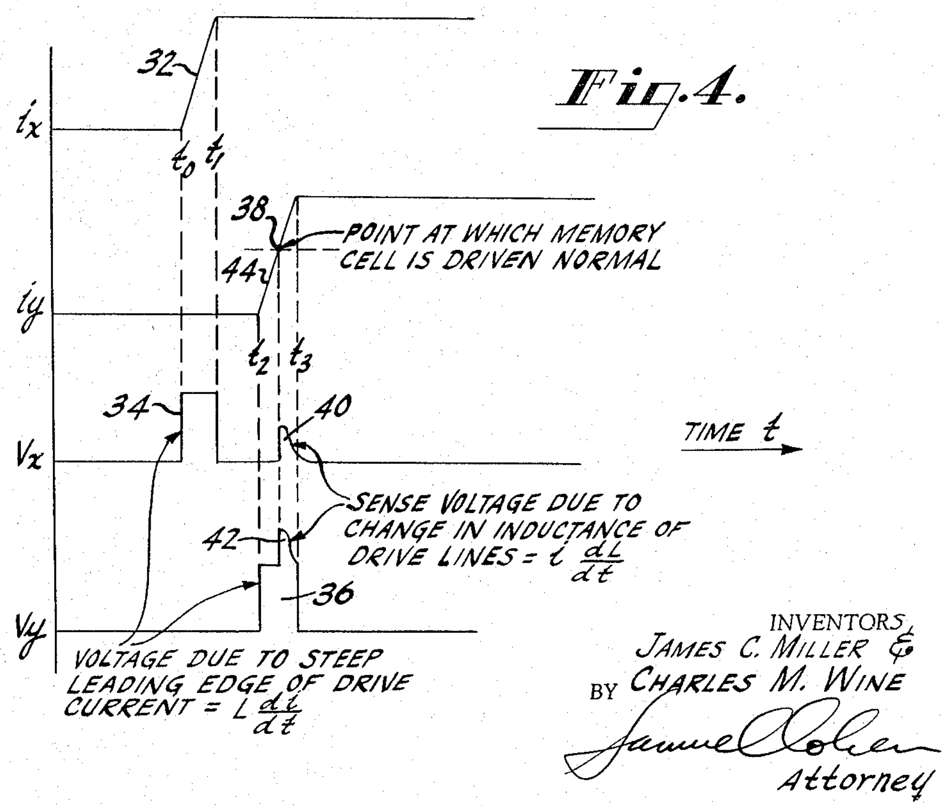
FIGURE 4 is a drawing of waveforms to help explain the operation of the memory of FIGURE 3.

The waveforms present in the memory of FIGURE 3 are shown, in somewhat idealized form, in FIGURE 4. It is assumed in these waveforms that the memory is storing the bit "1." The read current $i_x$ rises from zero to some fixed value, the leading edge starting at a time $t_0$, and ending at a time $t_1$. The current $i_y$ starts at a later time $t_2$ and rises to some given value by the time $t_3$. The leading edge 32 of the current $i_x$ causes a voltage pulse 34 to develop on the $x$ drive line 28 having an amplitude $$L\frac{di}{dt}$$

where L is the inductance of the drive lead 28 and $di/dt$ is the rate of change of read current with time during the leading edge of the read current pulse. In a similar manner, the read current pulse $i_y$ causes a voltage pulse 36 to develop on the $y$ drive lead 30.

At some point during the rise time of the later-applied pulse $i_y$, the combined magnetic field due to the currents $i_x$ and $i_y$ is sufficient to penetrate through the memory plane. The point in time at which this occurs is indicated at 38 in FIGURE 4. This is believed to cause the inductance of each of the drive lines 28 and 30 sharply to increase, and voltage pulses 40 and 42 appear on the respective lines. Such pulses may be sensed by an amplifier connected across either the $x$ drive line or the $y$ drive line. The connection of the amplifier across the $x$ drive line at present appears to be preferable because the sense voltage pulse 40 rises from a zero base line, whereas the sense pulse 42 is superimposed on top of the $$L\frac{di}{dt}$$

voltage pulse 36 due to the leading edge 44 of the $y$ lead current pulse.

According to theory, the voltage pulses 40 and 42 should be extremely sharp and of extremely short duration. In practice, (using a 9 x 9 memory) relatively high amplitude pulses (about 500 microvolts), such as shown, have been obtained. Their duration has been longer than predicted. The explanation for this is not known; however, the sense pulses have been found to be of sufficient amplitude readily to distinguish between the read-out of a stored "1" and the read-out of a stored "0." Further, the amplitude of the sense pulses has been found to be uniform at the different memory locations. In the same memory (9 x 9), the sense signal obtained using the continuous sheet sense plane discussed above was found to vary somewhat from memory location to memory location, and the signal amplitude at most locations was in the range of about 20 to 50 microvolts.

In the various figures which follow, the memories shown are illustrated schematically for the sake of drawing simplicity. In practice, it is to be understood that it is preferable that each memory include, in addition to the tin memory plane illustrated, a ground plane which is formed with a central opening over which the memory plane is positioned but which extends a substantial distance beyond the edges of the memory plane. It is also preferred that the drive leads extend for the major portion of their length over the ground plane to reduce the inductance exhibited by the drive leads to a minimum. It is also preferred that the drive leads enter the memory plane and leave the memory plane at locations close to one another to reduce the undesirable effects of image currents. The preferred arrangement of drive and return leads is discussed in some detail in the copending application "Memories," by R. W. Ahrons and D. Christiansen, mailed to the Patent Office on March 13, 1964, and assigned to the same assignee as the present application.

Figure 5:
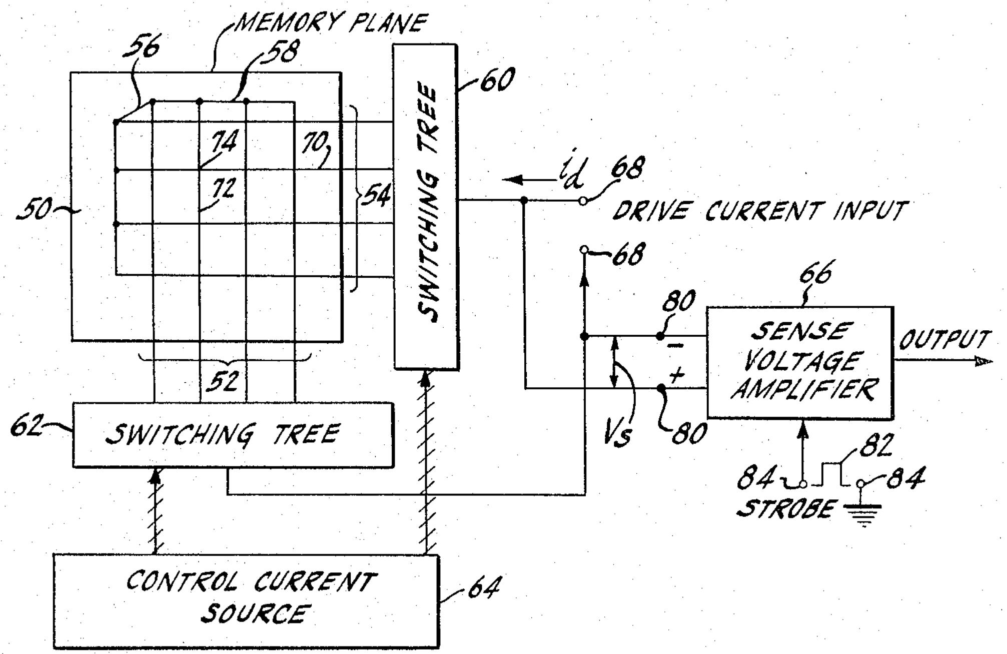
FIGURE 5 is a schematic showing of a 4 x 4 (16 storage location) memory according to the invention.

The memory of FIGURE 5 includes a superconductive memory plane 50, four $x$ drive leads 52 and four $y$ drive leads 54. The common return lead 56 for drive leads 54 is connected to the common connection 58 for the drive leads 52. The input drive current $i_d$ is applied through a switching tree 60 to a selected one of the drive leads 54. This drive current returns through a selected one of the drive leads 52 and the switching tree 62. The control current source 64 controls the path taken by the drive current. The output sense voltage produced may be applied to a sense amplifier 66 which is connected to terminals 88 which are in parallel with the drive current input terminals 68.

In the operation of the memory of FIGURE 5, the control current source applies control currents to the branches of the switching trees 60 and 62. The switching trees are preferably inductive switching trees such as illustrated in FIGURE 13 and described later. However, they may be "in line" or crossed-film cryotron trees instead. Each such switching tree consists of a common input lead and branches leading to four different output legs. The control current causes three of the four branches through the tree to assume a relatively high value of inductance and the remaining branch to assume a relatively low value of inductance. The input current steers into the low inductance branch.

Assume that the switching trees select leads 70 and 72. Assume also that the memory location at the cross-over point 74 of leads 70 and 72 is storing a "1." The drive current $i_d$ is in a sense to cause a "0" to be stored. This drive current steers from terminal 68 through tree 60 into lead 70, then goes through the common return lead 56, then steers back down lead 72 and switching tree 62 to the second input terminal 68.

Figure 6:
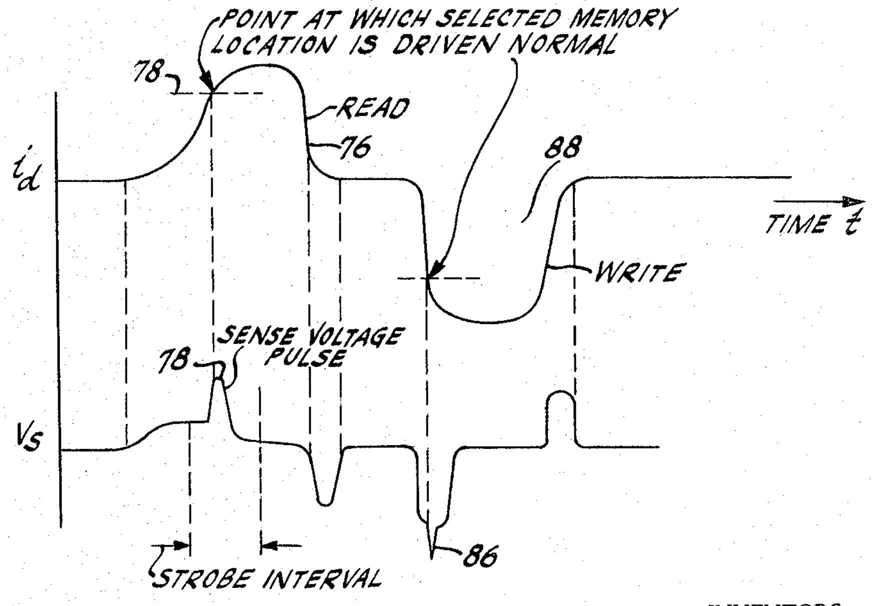
FIGURE 6 is a drawing of waveforms present in the circuit of FIGURE 5.

The read current pulse is shown at 76 in FIGURE 6. When this pulse reaches the amplitude indicated by dashed line 78, the memory location 74 is driven normal. At this point, a relatively sharp sense voltage pulse 78 is produced at the output terminals 80. The sense voltage amplifier 66 is strobed by voltage pulse 82 which is applied to terminals 84 during the interval of sense voltage pulse 78. Accordingly, this pulse is amplified and the remaining voltage pulses which appear at terminals 80 are discriminated against. These remaining pulses are the $$L\frac{di}{dt}$$

pulses and also the $$i\frac{dL}{dt}$$

pulse 86, which occur during the write interval. All of these extraneous pulses may be considered to be noise.

Information may be written into the memory by applying a write pulse 88 of opposite polarity to the read pulse 76. During the time the write pulse is applied, control currents are applied to the switching trees 60 and 62 in order to cause the trees to steer the current to a desired memory location.

A preferred form of switching tree is shown in FIGURE 13. It includes six inductive switches, each of which comprises a superconductive control plane 90 and a superconductive gate element 92. The control plane is preferably formed of a material, such as tin, which is driven to the normal state much more easily than the material, such as lead, of which the gate element is formed. The control plane 90 is driven from the superconducting state to the normal state by applying a current such as $I_0$ to the land 94.

In the operation of the inductive switching tree of FIGURE 13, a drive current $i_d$ is applied to the lands 96. Concurrently, select currents are applied to two of the four lands 94, **94*a*, 98, 98*a*. For example, drive currents may be applied to lands 94*a* and 98. In this case, the control planes 100, 102 and 104 are driven to the normal state. This causes the gate elements of the inductive switches 105, 106 and 108 to assume their high inductance condition. The gate elements 92 and 110 of the inductive switches 112 and 114 remain in their relatively low inductance state. Therefore, the input drive current steers through the path 96–92–110 and into drive lead 116**, since this path is of much, much lower inductance than the remaining paths.

The inductive switching tree of FIGURE 13 is illustrative. As an alternative, other of the inductive switches discussed in copending application Serial No. 321,580, now Patent No. 3,249,768, filed November 4, 1963, by Charles M. Wine, and assigned to the same assignee as the present invention, may be used instead. This application includes a more detailed explanation of the operation of the switches. The application also indicates that the switches may include "resistors" in shunt with the control ground planes for permitting operation in the intermediate, rather than in the normal state.

Figure 7:
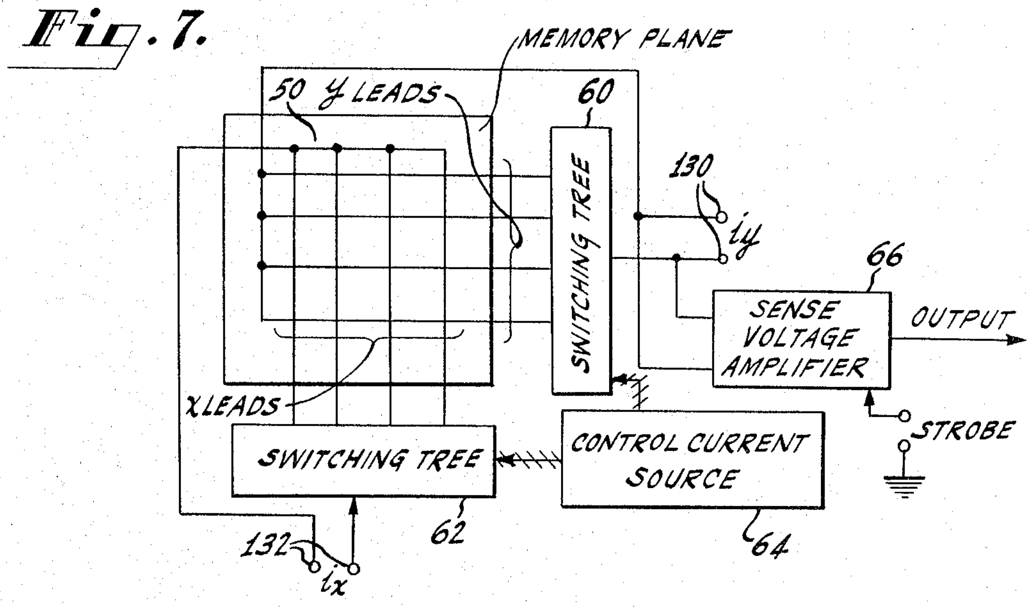
FIGURE 7 is a schematic showing of another cryoelectric memory according to the invention.

Another embodiment of the invention is shown in FIGURE 7. In this embodiment, the *x* and *y* leads are not joined to one another at the common return. Instead, they are separate from one another and require the application of separate drive currents $i_x$ and $i_y$.

The reference numerals in FIGURE 7 identify parts which are similar in structure and function to the correspondingly legended elements in the embodiment of FIGURE 5. The operation of the memory plane may more easily be followed from the waveforms of FIGURE 8.

It is possible in the memory of FIGURE 7 to store two different bits at each storage location. When the *x* and *y* current pulses are both negative, as indicated at 120 and 122 in FIGURE 8, information is written into the first and third quadrants, and when the *y* write pulse is negative-going and the *x* write pulse is positive-going, information is written into quadrants II and IV. The negative and positive pulses are shown at 124 and 126, respectively.

The above feature of the circuit of FIGURE 7 is illustrated in FIGURES 9*a* and 9*b*. As is clear from FIGURE 9*a*, with the polarity of the drive currents of $i_x$ and $i_y$ shown, information is stored in the first and third quadrants. If the drive current $i_y$ is maintained in the same direction and the direction of drive current $i_x$ is reversed, information is stored in the second and fourth quadrants. The crosses and dots in FIGURE 9*a* and FIGURE 9*b* indicate the magnetic field direction. Clearly in FIGURE 9*a* in the first and third quadrants, the magnetic fields add and, with properly adjusted current amplitudes for $i_x$ and $i_y$, penetrate through the superconductor memory plane. In the second and fourth quadrants in FIGURE 9*a*, the magnetic fields due to the drive currents oppose one another and no penetration through the memory plane occurs. A similar explanation holds for FIGURE 9*b*.

In the arrangement of FIGURE 7, the sense voltage is available across either the input terminals 130 for the *y* drive current, as shown, or the sense voltage may be obtained from across the input terminals 132. The arrangement of FIGURE 10 is similar in structure to the one of FIGURE 7, except that the common return lead 136 is capacitively coupled to the common return lead 138 by means of capacitor 140. This permits the sense voltage to be taken from between the input terminal 142 to one switching tree and the input terminal 144 to the other switching tree. The advantage of this arrangement is that the sense pulse obtained is of greater amplitude than the sense pulse obtainable from across only one lead. However, it is preferable that the capacitor 140 be of relatively small size to reduce current feedthrough from one tree to the other during the read and write cycles.

Figure 8:
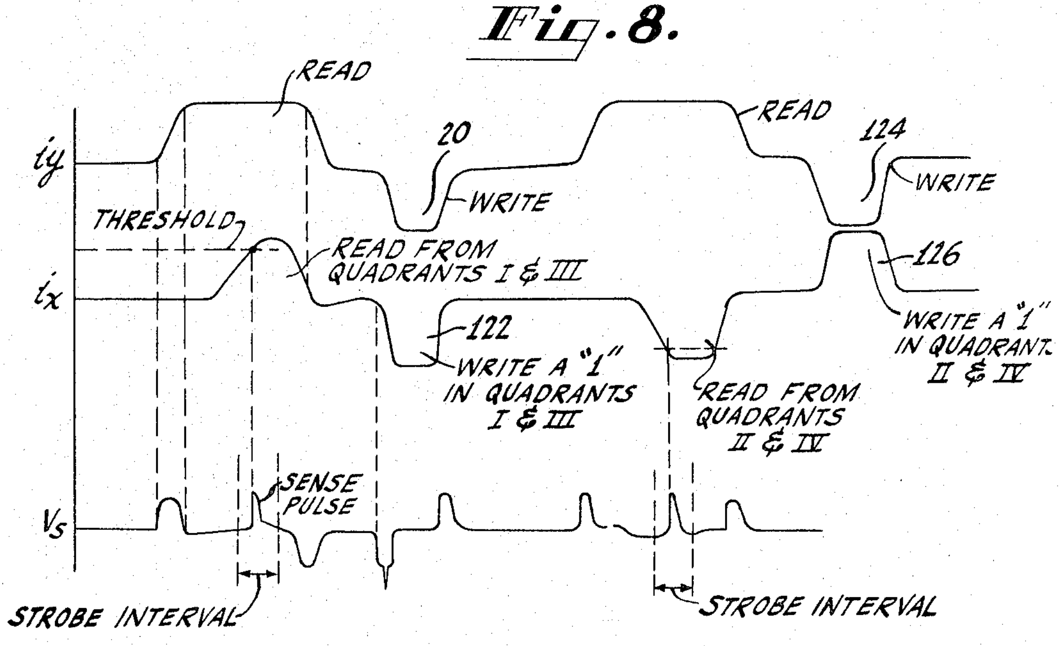
FIGURE 8 is a drawing of waveforms for the circuit of FIGURE 7.

The operation of the arrangement of FIGURE 10 is in respects other than the above quite similar to that of FIGURE 7. The waveforms of FIGURE 8 are similar to the waveforms employed in the arrangement of FIGURE 10.

FIGURE 11 illustrates a word-organized memory array. The waveforms of FIGURE 12 depict the operation of the circuit. The control current source for the word select switching tree 150 is assumed, but not shown. The sense voltage amplifiers are also assumed and not shown. The same number of amplifiers are required as there are bit windings. Four such bit windings 152, 154, 156 and 158 are shown in FIGURE 11.

In the operation of the memory of FIGURE 11, during the read interval, a read current pulse 166 (FIGURE 12) is applied through the switching tree 150 to a selected one of the four word leads 160, 161, 162 and 163. Concurrently, a positive-going read current pulse 164 is applied to selected ones of the digit leads 152, 154, 156 and 158. At each memory location at which a read current digit pulse 164 is coincident with a word pulse 166, a sense pulse is produced if that location is storing a "1" and no sense pulse is produced if that location is storing a "0." The sense pulse is shown at 168 in FIGURE 12.

Information is written into the memory of FIGURE 11 by applying a write pulse 170 through the switching tree 150 to a selected one of the word lines 160–163 and concurrently applying digit write pulses 172 to selected ones of the digit leads 152, 154, 156 and 158.

Throughout the various figures, it is preferable that the sense voltage amplifier be one of the strobed type. The strobed pulse may be synchronized with the read current pulse as, for example, by the means of a time pulse generator associated with the clock oscillator for the data processing machine.

In the various memories illustrated, from 1 to 16 storage locations are shown. It is to be appreciated that in practice the memory capacity may be substantially larger. A common size, for example, is 128 x 128, and sizes much larger than this are feasible.

For purposes of illustration, in the various memories discussed the memory planes are stated to be made of tin and the drive lines, ground planes, and, in the case of inductive switches, the gate elements, are stated to be made of lead. In practice, these materials are generally used because they are relatively inexpensive. It is to be understood, of course, that other superconductor materials may be substituted for lead and tin. However, it is preferable that those elements which always remain in the superconductive state be formed of a material which requires a greater magnetic field to be driven from the superconducting to the normal state than the materials of which the memory plane or control ground plane are made. By the same token, although only silicon monoxide insulation is mentioned, other types of insulation may be used instead.

What is claimed is:

1. In a cryoelectric memory circuit which includes a plurality of superconducting persistent current storage locations and drive leads which cross over one another over the respective storage locations and in which the drive leads are insulated from one another where they cross and are insulated from the persistent current storage locations, an arrangement for reading information out of the storage locations comprising:
- means for applying read currents to a selected pair of drive leads which cross at a level of amplitude sufficient to drive a storage location from the superconducting to the normal state, when that location is storing a persistent current indicative of a bit of given value; and
- means for sensing the change in voltage which occurs across at least one of the selected drive leads due to the change in inductance exhibited by the drive lead when said memory location is driven to the normal state.

2. In a cryoelectric memory circuit which includes a memory plane having a plurality of superconducting persistent current storage locations and drive leads which cross over one another over the memory plane and which are insulated from one another where they cross, an arrangement for reading information out of the plane comprising:
- means for applying read currents to a selected pair of drive leads which cross at a level of amplitude sufficient to drive a location in the memory plane normal, when that location is storing a bit of given value; and
- means for sensing the voltage which occurs across at least one of the selected leads, when said memory location is driven normal.

3. In a cryoelectric memory, in combination,
- a plurality of superconducting persistent current storage locations located in a plane;
- $x$ and $y$ drive leads which are insulated from one another and from said plane, which pass over said plane;
- means for applying read current pulses to a selected $x$ and a selected $y$ lead, of an amplitude sufficient to drive one of said memory locations normal, when that memory location is storing a bit of given value; and
- a sense amplifier coupled to one of said selected drive leads for sensing the voltage which develops on that lead when said memory location is driven from the superconducting to the normal state.

4. In a cryoelectric memory, in combination,
- a superconductive memory plane;
- $x$ and $y$ drive leads which are insulated from one another and from the memory plane, which pass over the memory plane;

- two inductive switching trees, one connected at its output to the $x$ drive leads and the other connected at its output to the $y$ drive leads;
- means for applying through the two switching trees to $x$ and $y$ leads selected by the respective trees, read current pulses of an amplitude sufficient to drive a memory location in the memory plane, defined by the crossing of the selected $x$ and $y$ leads, normal, when that memory location is storing a bit of given value; and
- a sense amplifier coupled to the input end of at least one of said switching trees for sensing the voltage which develops on the lead selected by that tree, when said memory location is driven from the superconducting to the normal state.

5. In a cryoelectric memory, in combination,
- a superconductive memory plane;
- $x$ and $y$ drive leads which are insulated from one another and from the memory plane, which pass over the memory plane;
- two switching trees, one connected to the $x$ drive leads and the other connected to the $y$ drive leads;
- means for applying through the two switching trees to $x$ and $y$ leads selected by the respective trees, read current pulses of an amplitude sufficient to drive a memory location in the memory plane, defined by the crossing of the selected $x$ and $y$ leads, normal, when that memory location is storing a bit of given value; and
- a sense amplifier connected to the input end of one of said switching trees for sensing the voltage which develops on the lead selected by that tree, when said memory location is driven from the superconducting to the normal state.

6. In a cryoelectric memory, in combination,
- a superconductive memory plane;
- $x$ and $y$ drive leads which are insulated from one another, and from the memory plane, and which pass over the memory plane;
- means for applying a current pulse to a selected $x$ lead, and, during the interval of said pulse, applying a second current pulse, whose leading edge occurs after the leading edge of the first pulse, to a selected $y$ lead, the two pulses together providing a magnetic field of sufficient magnitude to drive a memory location in the memory plane, defined by the crossing of the selected $x$ and $y$ leads, normal, when that memory location is storing a bit of given value; and
- a sense amplifier coupled to said selected $y$ drive lead for sensing the voltage which develops on that lead when said memory location is driven from the superconducting to the normal state.

References Cited by the Examiner

UNITED STATES PATENTS

| | | | |
|---|---|---|---|
| 3,047,744 | 7/1962 | Pankove | 307—88.5 |
| 3,172,085 | 3/1965 | Burns et al. | 340—173.1 |

OTHER REFERENCES

Maguire, Thomas: "Superconductive Computers—Commonplace in Ten Years?" Electronics, volume 34, Nov. 24, 1961, pp. 45–51.

BERNARD KONICK, *Primary Examiner.*

J. BREIMAYER, *Assistant Examiner.*